US005121102A

United States Patent [19]

Stricklin, Jr.

[11] Patent Number: 5,121,102

[45] Date of Patent: Jun. 9, 1992

[54] PROGRAMMABLE VOLTAGE SOURCE WITH ISOLATION NETWORK

[75] Inventor: Robert S. Stricklin, Jr., Carrollton, Tex.

[73] Assignee: Optek Technology, Inc., Carrollton, Tex.

[21] Appl. No.: 581,762

[22] Filed: Sep. 13, 1990

[51] Int. Cl.[5] .......... G08B 19/00; B60R 25/10

[52] U.S. Cl. .......... 340/521; 340/509; 340/515; 340/428; 340/660; 340/693; 307/10.3; 307/10.6; 180/173; 180/287

[58] Field of Search .......... 340/521, 506, 509-512, 340/515, 428, 660, 693; 307/9.1, 10.1, 10.2, 10.3, 10.6; 180/287, 173

[56] References Cited

U.S. PATENT DOCUMENTS

| | | | |
|---|---|---|---|
| 2,742,634 | 4/1956 | Bergen et al. | 340/510 |
| 2,832,947 | 2/1956 | Patchell et al. | |
| 3,082,412 | 4/1959 | Sargent | |
| 3,747,093 | 7/1973 | Ranganath | 340/510 |
| 3,997,890 | 12/1976 | Kendrick, Jr. | 340/510 |
| 4,071,007 | 1/1978 | Arix | 123/146.5 |
| 4,118,700 | 10/1978 | Lenihan | 340/510 |
| 4,148,372 | 4/1979 | Schroeder | 180/114 |
| 4,282,517 | 8/1981 | Wilson, Jr. et al. | 340/511 |
| 4,296,402 | 10/1981 | Szczepanski | 360/64 |
| 4,567,471 | 1/1986 | Acar | 340/510 |
| 4,583,036 | 4/1986 | Morishita et al. | 320/39 |
| 4,638,293 | 1/1987 | Min | 340/63 |
| 4,887,064 | 12/1989 | Drori et al. | 340/426 |

*Primary Examiner*—Donnie L. Crosland
*Attorney, Agent, or Firm*—Ross, Howison, Clapp & Korn

[57] ABSTRACT

A circuit for detecting the occurrence of an event and for providing an output signal upon the detection of the event includes a sensor for detecting the occurrence of the event. A programmable voltage source is interconnected to the sensor for generating the output signal of a predetermined voltage value. The predetermined voltage value is generated by the programmable voltage source when the programmable voltage source is activated by the sensor. Circuitry is interconnected to the programmable voltage source for preventing identification of the preselected voltage value when the programmable voltage source is not activated by the sensor.

4 Claims, 1 Drawing Sheet

PROGRAMMABLE VOLTAGE SOURCE WITH ISOLATION NETWORK

TECHNICAL FIELD OF THE INVENTION

The present invention relates to sensing systems, and more particularly to a sensor utilizing a programmable voltage source.

BACKGROUND OF THE INVENTION

Various types of security systems have been proposed which utilize sensors and triggers to control access to a protected area, such as by way of a door or a window to premises or a building. Additionally, sensors are utilized for controlling actuation of an ignition system on an automobile or other vehicle. Typically, to allow access through doors or other access points, devices which release or position locking elements, such as solenoid switches, are typically employed. Such sensors and trigger switches operate upon a predetermined voltage value to operate an electromechanical device to gain access to the premises. In order to actuate an automobile's ignition system, a predetermined voltage value is sensed by a microprocessor associated with the ignition system in order to operate the vehicle.

Conventional security systems although providing a reasonable measure of protection, can be defeated by an unauthorized person to gain entry to a secured premises or to steal a vehicle. By simulating the required output voltage value of the security sensor, the thief can in effect bypass the sensor and defeat the security system. In this manner, a key for operation of the vehicle ignition lock would not be necessary in order to activate the automobile's ignition system. Similarly, security cards or keys would be unnecessary to gain entry to a premises if the predetermined voltage levels necessary to operate electromechanical locks were determinable.

Since many improved security systems utilize programmable voltage sources which are operable upon sensing a predetermined condition such as, for example, the operation of a vehicle ignition lock or door lock, in order to prevent such security systems from being defeated, a need has arisen for a system for preventing detection of the predetermined voltage values which operate the security system. In systems were multiple sensors are utilized, in security systems and elsewhere, it is also desirable to identify which one of the multiple sensors has been activated where a common output signal line is utilized for connecting the multiple sensors.

SUMMARY OF THE INVENTION

In accordance with the present invention, a circuit for detecting the occurrence of an event and for providing an output signal upon the detection of the event is provided. The circuit includes a sensor for detecting the occurrence of the event. A programmable voltage source is interconnected to the sensor for generating the output signal of a predetermined voltage value. The predetermined voltage value is generated by the programmable voltage source when the programmable voltage source is activated by the sensor. Circuitry is interconnected to the programmable voltage source for preventing identification of the preselected voltage value when the programmable voltage source is not activated by the sensor.

In accordance with another aspect of the present invention, a circuit for detecting the occurrence of an event and for providing an output signal upon the detection of the event, where multiple events are detected is provided. The circuit includes a plurality of sensors for detecting the multiple events. A programmable voltage source is interconnected to the plurality of sensors for generating a plurality of output signals. Each of the plurality of output signals represents a preselected voltage value associated with one of the plurality of sensors for generating the voltage value selected by the programmable voltage source when the programmable voltage source is activated by one of the plurality of sensors. Circuitry is interconnected to the programmable voltage source for identifying which one of the sensors was activated based upon detection of the output signals.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
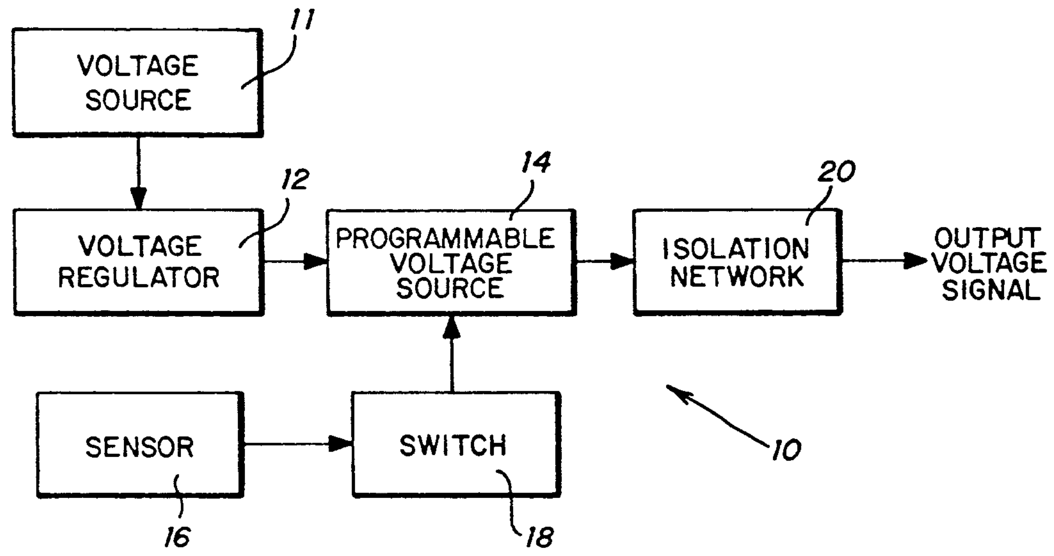
FIG. 1 is a schematic block diagram illustrating the present circuit.

Referring to FIG. 1, a circuit for detecting the occurrence of an event and for providing an output signal upon the detection of the event is illustrated in block diagram form, and is generally identified by the numeral 10. Circuit 10 is utilized for generating an output signal indicating the occurrence of an event, such as for example, the proper operation of a vehicle's ignition system by sensing the actuation of an ignition lock.

A voltage from a voltage source 11 is applied to circuit 10 through a voltage regulator 12 to a programmable voltage source 14. Programmable voltage source 14 may comprise, for example, a voltage divider network whose resistive values are determinative of the voltage value output by programmable voltage source 14. The output of programmable voltage source 14 is controlled by the output of a sensor 16. Actuation of sensor 16 generates an output signal to a switch 18 for controlling the output of programmable voltage source 14. Sensor 16 may comprise, for example, a Hall-effect sensor for sensing, for example, the rotation of a key in a vehicle ignition lock, a photoelectric device for sensing the presence of an actuating card or key in a lock of a door to a premises, or a motion detector. The present circuit 10 is not limited to a specific type of sensor; however, sensor 16 is only required to generate an output signal for controlling the output of programmable voltage source 14.

An important aspect of the present invention is the use of an isolation network 20 which is interconnected to receive the output of programmable voltage source 14. Isolation network 20 prevents the determination of the output voltage value of programmable voltage source 14 when sensor 16 is inactive, thereby preventing the would be thief from simulating the activation of sensor 16 to defeat the operation of sensor 16 and simulate the output of programmable voltage source 14 to generate the output voltage signal. Isolation network 20 may comprise, for example, a unity gain operational amplifier. The output voltage signal from isolation network 20 represents the programmable voltage source value generated by programmable voltage source 14 and is used to activate a security system or other control devices such as for example, as an input to a microprocessor of a vehicle ignition system. Therefore, the use of isolation network 20 prevents the determining of the voltage value which is generated through operation of sensor 16 and programmable voltage source 14 prior to actual sensor 16 operation.

Figure 2:
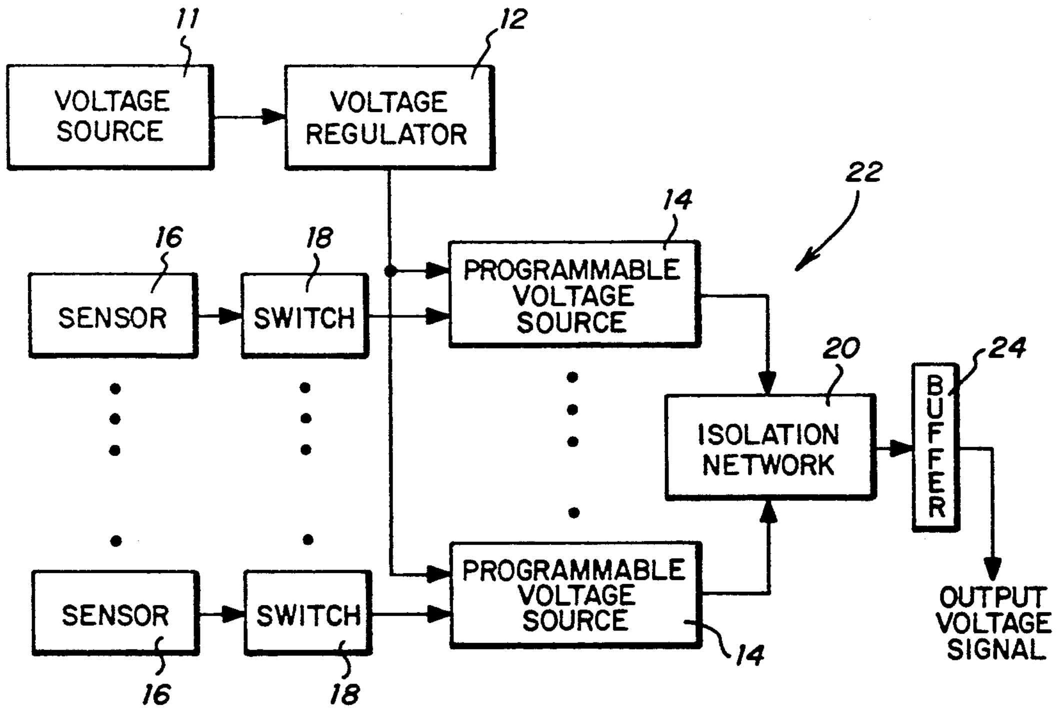
FIG. 2 is a schematic block diagram illustrating a second embodiment of the present circuit

The present circuit 10 can also be utilized in applications requiring multiple sensors 16 where it is desirable to identify which one of the multiple sensors is activated by a voltage presented on an common output line. Referring now to FIG. 2, wherein like numerals are utilized for like and corresponding components previously identified with respect to FIG. 1, circuit 22 is illustrated for use with multiple sensors 16. Only one of the multiple sensors 16 is activated at any given time, each sensor 16 generates a different, predetermined voltage level identified by an associated programmable voltage source 14. The outputs of programmable voltage sources 14 are applied to isolation network 20 whose output is applied to a multiple state buffer 24. The detection of a particular voltage output from multiple state buffer 24 will be indicative of the particular sensor 16 activated. The output state of multiple state buffer 24 will be determined by the sensor 16 condition or an external select line.

It therefore can be seen that the present invention provides for a circuit for detecting the occurrence of an event and for providing an output signal based upon the detection of the event which prevents the generation of the output signal by preventing the simulation of a voltage value where the sensor did not in fact detect the desired event.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A circuit for detecting the occurrence of an event and for providing an output signal upon the detection of the event comprising:

a sensor for detecting the event;

a programmable voltage source interconnected to said sensor for generating the output signal of a preselected voltage value, the output signal being generated by said programmable voltage source when said programmable voltage source is activated by said sensor; and means interconnected to said programmable voltage source for preventing identification of said preselected voltage value when said programmable voltage source is not activated by said sensor.

2. The circuit of claim 1 wherein said sensor comprises a Hall-effect sensor.

3. The circuit of claim 1 wherein said sensor comprises an optoelectric device.

4. The circuit of claim 1 wherein said means for preventing identification of said preselected voltage value comprises an operational amplifier.

* * * * *